M. VAN GELDER.
WHEEL FENDER.
APPLICATION FILED JUNE 4, 1912.
1,050,405.
Patented Jan. 14, 1913.
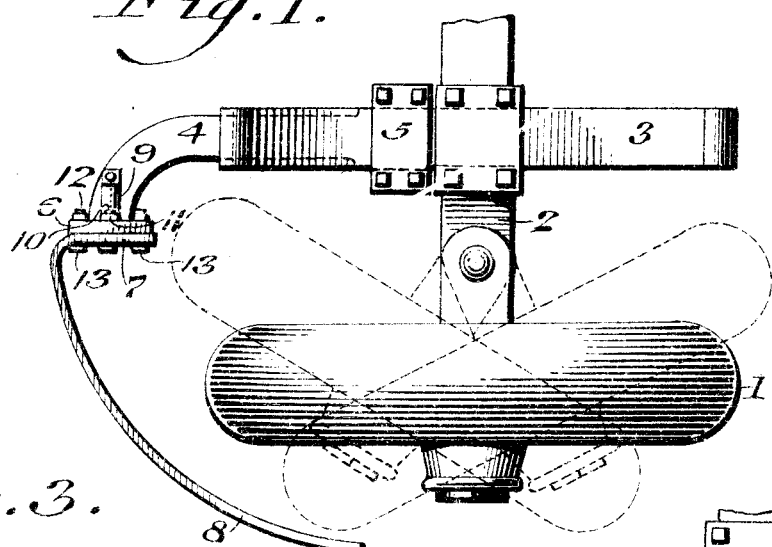
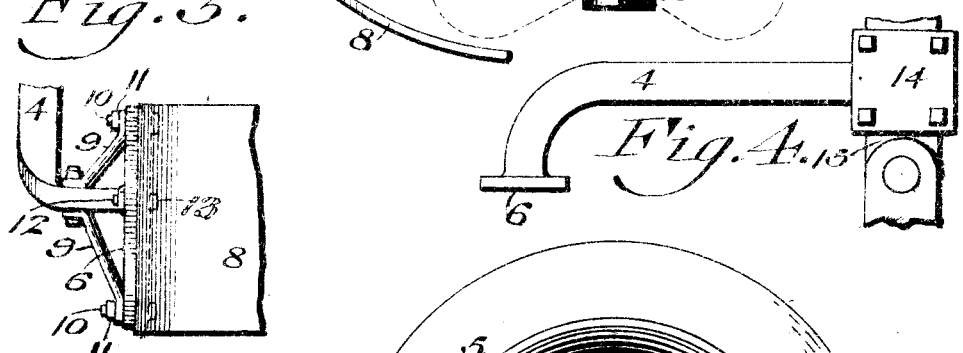
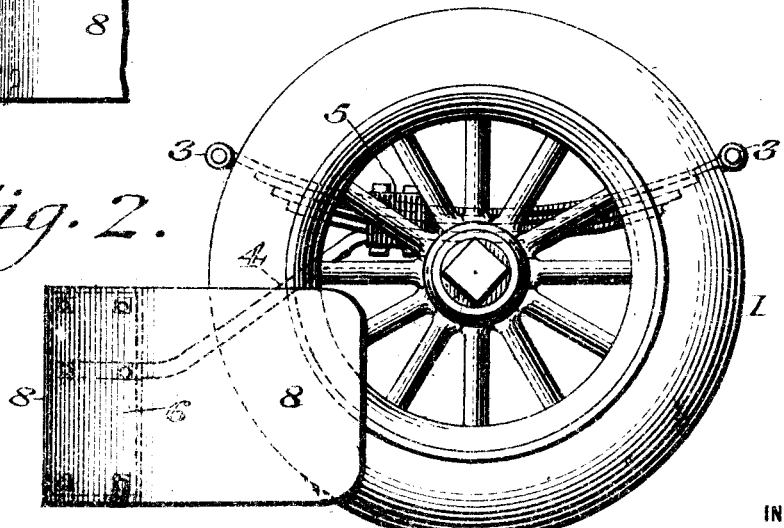
WITNESSES
O. F. Nagle
H. G. Dietrich
INVENTOR
Martinus van Gelder
BY Niederstein & Fairbank
ATTORNEYS

UNITED STATES PATENT OFFICE.

MARTINUS van GELDER, OF PHILADELPHIA, PENNSYLVANIA.

WHEEL-FENDER.

1,050,405.

Specification of Letters Patent.

Patented Jan. 14, 1913.

Application filed June 4, 1912. Serial No. 701,629.

*To all whom it may concern:*

Be it known that I, MARTINUS VAN GELDER, a subject of the Queen of the Netherlands, residing in the city and county of Philadelphia, State of Pennsylvania, have invented a new and useful Wheel-Fender, of which the following is a specification.

My invention consists of a shield or guard of resilient material applicable to an automobile or other vehicle in front of a wheel thereof, so as to prevent a person in the path of said wheel from striking against the latter, while on the contrary said shield receives the impact of the person, thus reducing the force of the blow to which he is subjected, and minimizing the danger of skidding occasioned by the blow, the shield being adapted also to deflect the person laterally and land him a comparatively safe distance from the wheel especially at the side thereof.

The invention is satisfactorily illustrated in the accompanying drawing, but the important instrumentalities thereof may be varied, and so it is to be understood that the invention is not limited to the specific arrangement and organization shown and described.

Figure 1 represents a plan view of a wheel shield or guard embodying my invention and including a portion of an automobile to which the same is applicable. Fig. 2 represents a side elevation thereof. Fig. 3 represents a front elevation of a portion thereof. Fig. 4 represents another embodiment of my invention.

Similar numerals of reference indicate corresponding parts in the figures.

Referring to the drawings:—1 designates one of the wheels of an automobile, the same being mounted on the portion 2 of the running gear, as usual in such cases, and 3 designates one of the front springs of the vehicle. 4 designates an arm or bracket which is secured by the clip 5 or other means to the spring 3 and extends forwardly and laterally therefrom, it having on its front end the head 6 to which is secured the angularly-extending limb 7 of the sheath or guard 8, which latter consists of a plate preferably of metal curving laterally outward from said head in front of said wheel, and continuing its curvature rearwardly so as to occupy a position at the side of the wheel, especially at the front portion thereof or forward of the hub of the wheel. It will be seen that if a person is in the path of said wheel he may be struck by the shield, which owing to its resilient nature will yield and so materially break or reduce the force of the blow which the person may receive. Then the person will be sheared over the shield laterally to the outer terminal of the same and projected out from the path of the wheel, and so prevented from being run over and wedged under the shield. Owing to the impact of the person against the shield, the latter will yield rearward and be brought forcibly against the wheel, thus acting as a brake which at least will check the speed of the vehicle.

In order to provide a strong connection for the limb of the shield with the bracket 4, I provide the braces 9 which extend from the sides of said bracket to the head 6 and are secured thereto by the bolts 10 and nuts 11. Bolts 12 are passed through said head 6 and the limb 7 of the shield and tightened by the nuts 13, said head stiffening said limb and serving with the braces 9 to secure the shield to the bracket in a firm and durable manner.

In Fig. 4 I show an arm or bracket 4 which is adapted to be secured by the clip 14 to the stationary member 15 of the axle of the wheel in lieu of the spring shown in the other figures, without, however, materially producing different results from those hereinbefore named.

The corners of the rear end of the shield are rounded so that if portion of the body of the person striking the shield should come in contact with said end, such portions will not be cut or otherwise injured, which would not be the case if such corners were angular.

Having thus described my invention what I claim as new and desire to secure by Letters Patent, is:—

1. In a vehicle having a swiveled steering wheel, a bracket secured to the rigid frame of such vehicle to project forward of such wheel, and a resilient plate supported upon the forward end of said bracket and curved to extend in front and around the side of said wheel to allow free swiveled movement of the same.

2. In a vehicle having a swiveled steering wheel, a forwardly projecting and laterally curved bracket secured to the rigid frame of such vehicle to project forward of such wheel, and a resilient sheet-metal plate secured to the outer end of said bracket and curved to extend around the front and side of said wheel to allow free swiveled movement of the same.

MARTINUS van GELDER.

Witnesses:
    John A. Wiedersheim,
    N. Bussinger.